US005440947A

United States Patent [19]

Manganelli

[11] Patent Number: 5,440,947

[45] Date of Patent: Aug. 15, 1995

[54] TIMING LOCK APPARATUS FOR DIESEL ENGINES

[76] Inventor: Robert J. Manganelli, 3261 W. Helena, Phoenix, Ariz. 85023

[21] Appl. No.: 169,020

[22] Filed: Dec. 20, 1993

[51] Int. Cl.[6] .............. G01M 15/00

[52] U.S. Cl. .............. 74/527; 123/198 R; 33/600; 81/439; 81/490

[58] Field of Search .............. 74/527; 123/198 R; 81/177.4, 177.6, 490, 439; 33/600, 605, 606, 645, 533

[56] References Cited

U.S. PATENT DOCUMENTS

| | | | |
|---|---|---|---|
| 662,748 | 11/1900 | Wood | 81/177.4 |
| 1,501,222 | 7/1924 | Lamp | 81/439 |
| 2,632,484 | 3/1953 | Johnson | 81/439 |
| 2,730,145 | 1/1956 | Brown | 81/490 |
| 3,034,550 | 5/1962 | Dahl | 81/177.6 |
| 4,328,721 | 5/1982 | Massari | 81/439 |
| 4,895,016 | 1/1990 | Cameron et al. | 73/116 |
| 4,930,371 | 6/1990 | Schneider | 74/527 |

*Primary Examiner*—Richard M. Lorence
*Assistant Examiner*—David Fenstermacher
*Attorney, Agent, or Firm*—H. Gordon Shields

[57] ABSTRACT

Timing pin apparatus for locking a fly wheel of a diesel engine in place for timing purposes includes a housing securable to a bell housing of a diesel engine and a timing pin movable in the housing and into the bell housing to engage a detent in the diesel engine flywheel. The timing pin is spring loaded to engage the flywheel and to retract from the flywheel. A sleeve disposed about the housing loads and unloads a spring for urging the timing pin into the detent in the flywheel when loaded, and when unloaded allows a second spring to automatically retract the pin from flywheel engagement.

16 Claims, 2 Drawing Sheets

TIMING LOCK APPARATUS FOR DIESEL ENGINES

BACKGROUND OF THE INVENTION

1. Field of the Invention

This invention relates to diesel engines and, more particularly, to the timing of diesel engines by inserting a pin into a depression on e flywheel to lock the engine to a predetermined orientation of the crankshaft for timing purposes.

2. Description of the Prior Art

U.S. Pat. No. 4,895,016 (Cameron et al) discloses a timing pin assembly for a diesel engine. The apparatus includes a threaded portion which is secured to a bell housing of a diesel engine. A spring biased piston extends through the bell housing and into a depression or detent in the fly wheel of the diesel engine. When the detent is aligned with the aperture in the bell housing through which the pin extends, the pin engages the detent to lock the flywheel, and accordingly the crankshaft and camshaft, in their predetermined locations. The locations are either at the 0 degree or 180 degree locations of the camshaft. The timing of the valves and fuel injection is made in reference to both the 0 degree and 180 degree location.

The pin in the '016 patent is manually retracted by a finger secured to the pin. The finger extends outwardly from the housing of the pin for the manual retraction.

The apparatus may be secured to the bell housing and the pin will be spring biased against the flywheel. The engine is turned over until the depression or detent in the flywheel is aligned with the pin, and the bias of the compression spring against the pin moves the pin into the detent to lock the flywheel in the desired location.

Due to the designs of diesel engines, and to the close quarters in which the timing pin apparatus is used, it is sometimes very difficult to manually retract the timing lock pin. The apparatus of the present invention overcomes such a manual retraction problem by providing an automatic retraction.

SUMMARY OF THE INVENTION

The invention described and claimed herein comprises a cylinder with a threaded portion at one end that engages a threaded aperture in the bell housing of a diesel engine. A timing or locking pin is disposed within the cylinder and is movable longitudinally therein. Two springs oppose each other in biasing the timing or locking pin. A heavier spring extends between the outer end of the cylinder and a head on the pin, and a lesser spring extends between the head of the pin and the inner head of the cylinder. The heavier spring biases the timing pin into engagement with a detent in the flywheel, while the lighter spring retracts the pin from the detent.

A pair of axially extending slots extend diametrically along the cylinder inwardly from the outer end. A sleeve is disposed about the cylinder and a pin extends diametrically through the sleeve and through the slots. The heavier spring extends between the piston head and the pin for biasing the piston to the lock position. The axially extending slots include locking detents into which the sleeve pin may be moved to provide the locking bias to move the timing pin inwardly into the recess or detent in the flywheel. When the sleeve pin is moved out of the detents, the force of the larger spring is relieved and the lighter spring then moves the timing pin out of the detent to allow the flywheel to move.

Among the objects of the present invention are the following:

To provide new and useful apparatus for locking a flywheel in place;

To provide new and Useful timing pin apparatus for a diesel engine;

To provide new and useful timing pin apparatus with automatic pin insertion; and To provide new and useful timing pin apparatus with automatic pin retraction.

BRIEF DESCRIPTION OF THE DRAWING

FIG. 2A is a view in partial section sequentially following FIG. 2,

DESCRIPTION OF THE PREFERRED EMBODIMENT

Figures 1, 3, 4, 5:
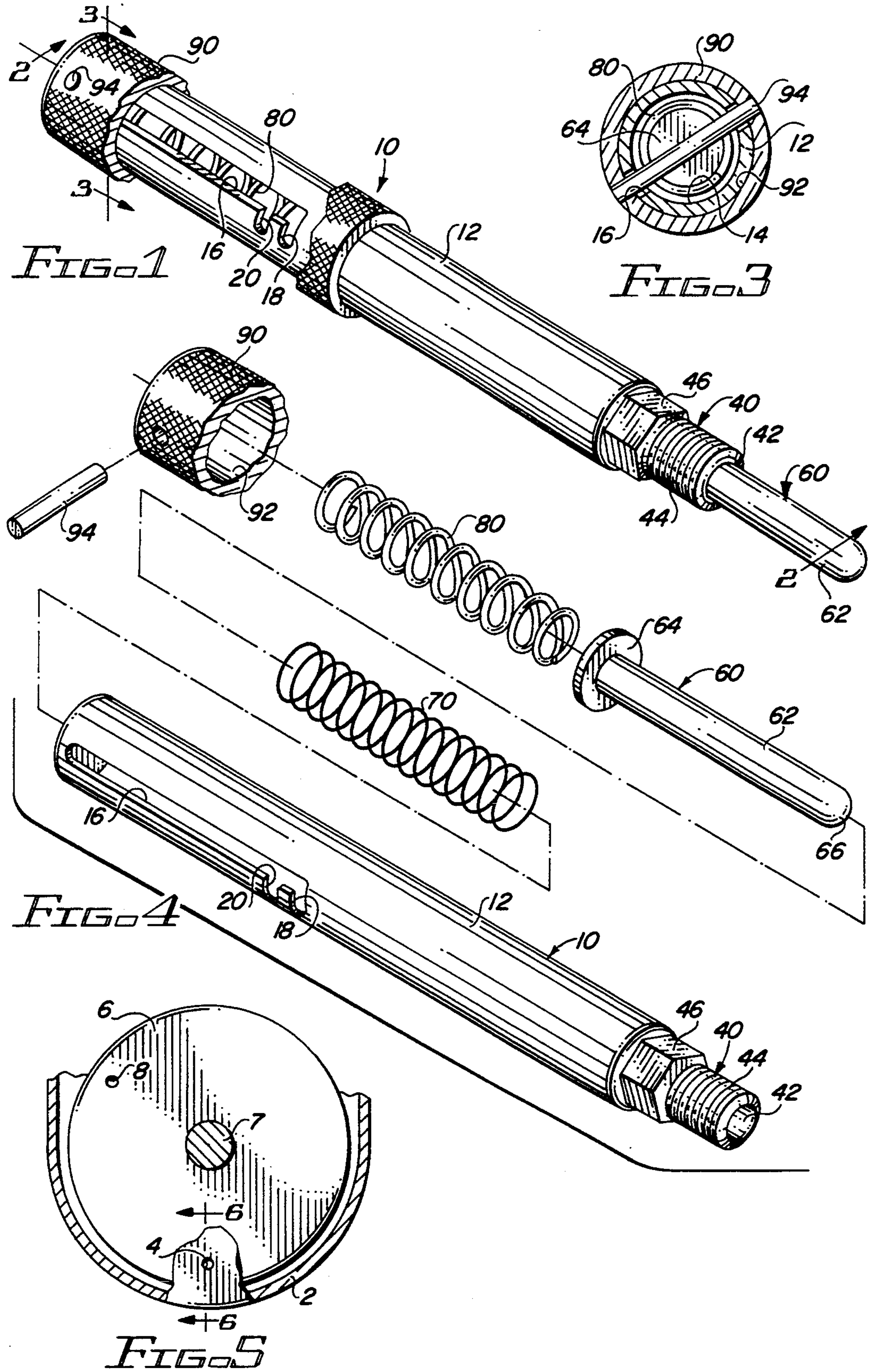
FIG. 1 is a perspective view of the apparatus of the present invention.
FIG. 3 is a view in partial section taken generally along line 3—3 of FIG. 1.
FIG. 4 is an exploded perspective view of the apparatus of the present invention.
FIG. 5 is a view in partial section illustrating the use environment of the apparatus of the present invention.
Figures 2, 2A, 6, 7, 8, 9, 10:
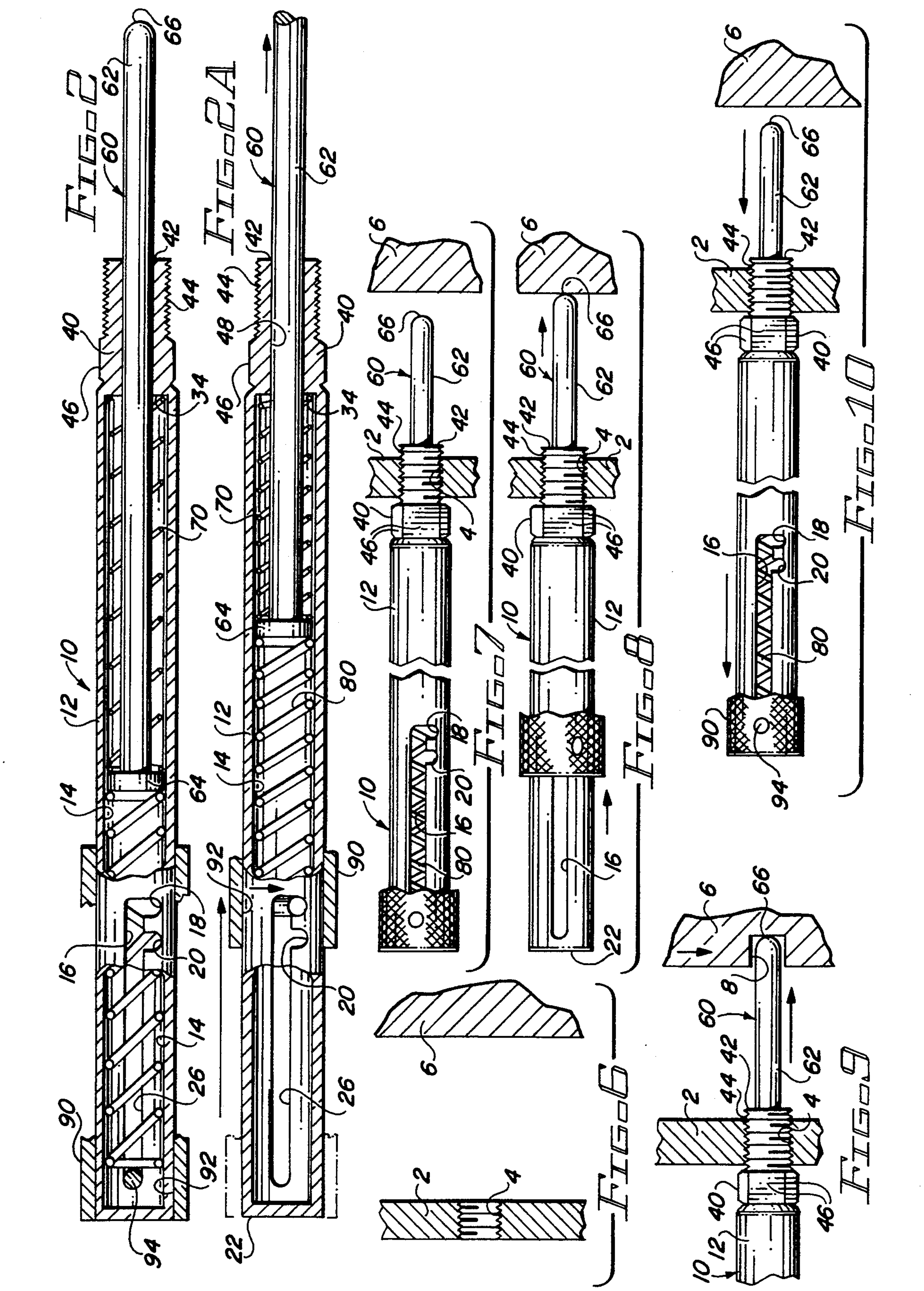
FIG. 2A is a view in partial section taken generally along line 2—2 of FIG. 1.
FIG. 6 is a view in partial section taken generally along line 6—6 of FIG. 5.
FIG. 7 is a view in partial section illustrating the apparatus of the present invention in its use environment.
FIG. 8 is a side view in partial section sequentially following FIG. 7.
FIG. 9 is a view in partial section sequentially following FIG. 8.
FIG. 10 is a view in partial section sequentially following FIG. 9.

FIG. 1 is a perspective view of timing lock apparatus 10 of the present invention, usable in the timing of diesel engines. FIG. 2 and FIG. 2A are side views in partial section, with FIG. 2 taken generally along line 2—2 of FIG. 1. FIG. 2A sequentially follows FIG. 2 in illustrating the operation of the apparatus 10. FIG. 3 is a view in partial section taken generally along line 3—3 of FIG. 1, illustrating some of the elements involved in the tool apparatus 10. FIG. 4 is an exploded perspective view of the apparatus 10 showing the various elements which comprise the tool apparatus 10. For the following discussion, reference will primarily be made to FIGS. 1, 2, 2A, 3, and 4.

The timing tool apparatus 10 of the present invention includes a cylinder 12 which includes a longitudinally extending bore 14. Extending axially along the cylinder 12 are two longitudinal slots including a slot 16 and a slot 26. The slots 16 and 26 are aligned with each other.

The cylinder 12 includes a rear end 22. The slots 16 and 26 extend longitudinally along the cylinder 12 from adjacent to the rear end 22.

The slots 16 and 26 include locking detents at the ends of the slots remote from the rear end 22. Two locking detents for the slot 16 are shown, including a lock detent 18 and a lock detent 20.

At the front end of the cylinder 12, remote from the end 22, is a front attachment boss 40. The front attachment boss 40 terminates in front end 42. Extending rearwardly from the front end 42 are external threads 44. The external threads 44 terminate adjacent to a plurality of wrench flats 46. The wrench flats 46 are between the cylinder 12 and the threads 44.

Extending through the attachment boss 40 is a bore 48. The bore 48 is coaxially aligned with the bore 14, but has a less diameter than the bore 14.

Disposed within the bore 14 and the bore 48 is a timing pin 60. The timing pin 60 extends outwardly beyond the attachment boss 40 and terminates outwardly in a rounded front end 62. Disposed within the bore 14 is a rear head 64. The outside diameter of the rear head 64 is just slightly less than the inside diameter of the bore 14. The head 64 accordingly moves easily within the bore 14. The outside diameter of the pin 60 is slightly less than the inner side diameter of the bore 48, and accordingly moves easily therein. The bore 48 comprises a guide portion for guiding the timing pin 60 as it moves in the cylinder 12.

Two springs are disposed within the bore 14 of the cylinder 12. They include a front retract spring 70 and a rear lock spring 80. The lock spring 80 is disposed within the bore 14 rearwardly of the head 64. The retract spring 70 is disposed within the bore 14 about the lock pin 60 and between the head 64 and a shoulder 34 between the cylinder 12 and the attachment boss 40. The shoulder 34 comprises the front end of the bore 14.

Disposed about the cylinder 12 is a locking sleeve 90. The locking sleeve 90 includes an interior bore 92, the diameter of which is slightly greater than the outside or outer diameter of the cylinder 12. The sleeve 90 is movable along the cylinder 12.

Extending diametrically through the lock sleeve 90, and extending through the aligned longitudinally extending slots 16 and 26, is a lock or sleeve pin 94. The spring 80 extends between the lock pin 94 and the head 64 of the timing pin 60.

The overall length of the sleeve 90 is such as to cover the slots 16 and 26 when the sleeve 90 is in the retract or rear position, as illustrated in FIGS. 1 and 2. The fully retracted or rear position of the sleeve 90 is defined when the pin 94 is at the rear host end of the slots 16 and 26, as shown in FIG. 2. This, of course, helps to protect the interior of the apparatus 10, in particularly the interior of the cylinder 12, from dirt, grease, etc., from the environment in which the apparatus 10 is used.

The locking spring 80 is about twice as powerful as is the retract spring 70. Accordingly, when the locking sleeve 90 is moved to its locked or closed position, forwardly until 18 or 20, as shown in FIG. 2A, and, of course, in the corresponding aligned locking detents (not shown) for the longitudinal slot 26, them retract spring 70 is compressed. This is also shown in FIG. 2A.

The movement of the locking sleeve 90 forwardly biases the timing pin 60 forwardly, or to its full outwardly position, with the front and 66 at its maximum distance from the front attachment boss 40. This is shown in FIG. 2A and also in FIGS. 7, 8, and 9.

When the locking sleeve 90 is moved rearwardly, by first slightly rotating the sleeve so that the locking pin 94 is moved out of its locking detents, the locking spring 80, which is, of course, a compression spring, extends its full length to relieve the forward bias against the head 64 of the timing pin 60. This allows the retract spring 70, which, as shown in FIG. 2A, is compressed, to move the timing pin 60 rearwardly, and thus to retract the timing pin 62 to the general position illustrated in FIG. 2.

The use of the timing tool apparatus 10 is illustrated in FIGS. 5, 6, 7, 8, 9, and 10. For the following discussion, reference will primarily be made to those Figures.

The use environment of the timing tool apparatus 10 is illustrated in FIG. 5, which comprises a schematic illustration, in partial section, of a portion of a diesel engine, including a bell housing 2. The bell housing 2 includes a threaded aperture 4 disposed adjacent to a flywheel 6. The flywheel 6 is secured to a crankshaft 7. The flywheel 2 includes a timing bore or detent 8. When the timing bore 8 is aligned with the threaded aperture 4 in the bell housing 2, the crankshaft 7 is positioned appropriately for timing purposes. Obviously, such timing is well known and understood in the diesel engine art. Insofar as the apparatus of the present invention is concerned, the engine is typically turned over until the cylinder member 1 is in proper firing order, with the timing bore or timing recess 8 aligned with the threaded aperture 4. Initial timing is then set and the engine is turned over with the flywheel rotating three hundred sixty degrees until the recess or bore 8 is again aligned with the aperture 4. The next timing procedure is then accomplished.

When the timing bore or detent 8 is adjacent to the threaded aperture 4, the tool apparatus 10 is threadedly secured to the bell housing 2 by inserting the exterior threaded portion 44 into the threaded aperture 4. The wrench flats 46 are used to appropriately tighten the apparatus 10 to the bell housing 4. This is illustrated in FIG. 7.

When the apparatus 10 is secured to the bell housing 4, with the locking sleeve 90 in its rear or retracted position, the front end or tip 66 of the lock pin 60 is disposed adjacent to the flywheel 2. The locking sleeve 90 is then moved forwardly until the lock pin or sleeve pin 94 is disposed in either the locking detent 18 or 20. The difference between the two detents 18 and 20 is a relatively short distance, depending on what particular model diesel engine the apparatus 10 is being used with. At any rate, the forward movement of the locking sleeve 90 moves the timing pin 60 forwardly until the front end 66 is disposed against the front face of the flywheel 2. This is shown in FIG. 8.

As the engine turns slightly, continued movement of the flywheel 6 aligns the timing bore or recess or detent 8 with the aperture 4. Since there is a forward bias on the locking pin 60, as soon as the detent 8 is aligned with the pin 60, the pin 60 moves into the detent 8 until the front end 66 bottoms out in the detent 8. The flywheel 6 is accordingly locked in place with the locking bore or recess or detent 8 aligned with the aperture 4 in the bell housing 2. This is shown in FIG. 9.

With the flywheel 6 appropriately aligned for timing purposes, the necessary timing adjustments for the valves and fuel pump timing may be made. When the appropriate adjustments have been made, the locking sleeve 90 is moved rearwardly by moving the pin 94 out of its detents and moving the sleeve rearwardly under the bias of the now unloading compression spring 80. The rearward movement of the sleeve 90 fully unloads the spring 80 and allows the retract spring 70 to retract the pin 60 from the detent 8.

If the pin 60 happens to be held by a slight lateral bias of the flywheel 6, a simple rocking movement of the flywheel 6 is all that is necessary to relieve such bias. Once the lateral bias is removed, the retract spring 70 then retracts the pin 60 from the detent 8 and the flywheel 6.

The flywheel 6 may then be rotated 360 degrees until the detent 8 is again aligned with the aperture 4 for the next timing procedure. The timing tool apparatus 10 is again used as described above. With the apparatus 10 still affixed to the bell housing 2, the sleeve 90 is simply moved forwardly again to bias the timing pin 60 against the flywheel 6 and into the recess 8. The timing procedure is then carried out.

At such time as the timing of the engine has been completed, and the pin 60 retracted as described above, the timing tool apparatus 10 is removed from the bell housing 2 by disengaging the threads 44 from the threaded aperture 4. This may be accomplished by use 0f a wrench on the wrench flats 46.

As shown in FIGS. 1, 2, 2A, 7 and 10, there is a portion of the timing pin 60 which is always outside of the cylinder 12. The overall length of the timing pin 60 is configured according to the diesel engines the apparatus will be used with.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Engine timing pin apparatus comprising in combination:

housing means to be secured to a bell housing of an engine;

a bore in the housing means;

pin means movable in the bore and including a pin portion extending out of the bore for engaging a detent in a flywheel within the bell housing;

a first spring for biasing the pin means in a first direction to move the pin portion to engage the detent in the flywheel;

a second spring for biasing the pin means in a second direction to move the pin portion out of engagement with the detent in the flywheel;

means for orienting the first spring in a loaded condition to bias the pin portion to engage the detent in the flywheel and to load the second spring and for orienting the first spring in an unloaded condition for allowing the second spring to move the pin portion out of engagement with the detent in the flywheel.

2. The apparatus of claim 1 in which the housing means includes:

a cylinder having a first end and a second end, a threaded portion at the first end for securing the housing means to the bell housing, and slot means axially extending along the cylinder.

3. The apparatus of claim 2 in which the slot means includes a pair of diametrically aligned slots, and the lock pin is disposed in the diametrically aligned slots.

4. The apparatus of claim 3 in which the slot means further includes detent means for receiving the lock pin to lock the sleeve with the first spring in the loaded condition.

5. The apparatus of claim 1 in which the pin means further includes a timing pin movable in the bore in the housing means, and a head on the timing pin against which the first spring is disposed.

6. The apparatus of claim 5 in which the housing means further includes a guide portion for guiding the timing pin as it moves in the bore and a shoulder on the guide portion, and the second spring is disposed about the timing pin and extends between the shoulder and the head on the timing pin.

7. Timing pin apparatus for use with a diesel engine having a flywheel, a timing recess in the flywheel, a bell housing disposed about the flywheel, and a threaded aperture extending through the bell housing, the combination of:

movable timing pin means having a portion extendable into the timing recess in the flywheel;

housing means having a portion securable to the threaded aperture in the bell housing and in which the timing pin is movable;

a first spring for urging the timing pin in a first direction to extend into the timing recess;

a second spring for urging the timing pin in a second direction to retract the timing pin out of the timing recess; and means for loading the first spring for urging the timing pin in the first direction, including a sleeve disposed about the housing means, a sleeve pin secured to the sleeve and extending diametrically through the housing means, and the first spring is disposed against the sleeve pin, whereby movement of the sleeve and sleeve pin in the first direction loads the first spring.

8. The apparatus of claim 7 in which the housing means includes a cylinder for receiving the timing pin and a pair of axially extending slots in the cylinder in which the sleeve pin is disposed.

9. The apparatus of claim 7 in which timing pin means includes a timing pin and a head on the timing pin disposed in the housing means and a front end disposed outside the housing means and extendable into the timing recess in the flywheel.

10. The apparatus of claim 9 in which the first spring is disposed in the housing means between the head on the timing pin and the means for loading the first spring.

11. The apparatus of claim 10 in which the second spring is disposed about the timing pin and extends between the head on the timing pin and the portion of the housing means securable to the threaded aperture.

12. The apparatus of claim 1 in which the first spring is stronger than the second spring whereby the loading of the first spring to bias the pin portion to engage the detent in the flywheel also loads the second spring, and the unloading of the first spring allows the second spring to move the pin portion out of engagement with the detent in the flywheel.

13. Engine timing pin apparatus comprising in combination:

housing means to be secured to a bell housing of an engine, including a cylinder having a first end and a second end, a threaded portion at the first end for securing the housing means to the bell housing, and slot means axially extending along the cylinder;

a bore in the cylinder of the housing means;

pin means movable in the bore and including a pin portion extending out of the bore for engaging a detent in a flywheel within the bell housing;

a first spring for biasing the pin means in a first direction to move the pin portion to engage the detent in the flywheel;

a second spring for biasing the pin means in a second direction to move the pin portion out of engagement with the detent in the flywheel;

means for orienting the first spring in a loaded condition to bias the pin portion to engage the detent in the flywheel and for orienting the first spring in an unloaded condition for allowing the second spring to move the pin portion out of engagement with the detent in the flywheel, including a sleeve disposed about the cylinder, and a lock pin disposed in the slot means and secured to the sleeve, and the first spring extends between the lock pin and the pin means in the bore, and movement of the sleeve loads and unloads the first spring.

14. The apparatus of claim 13 in which the first spring is relatively stronger than the second spring.

15. The apparatus of claim 13 in which the slot means includes a detent for receiving the lock pin to lock the sleeve with the first spring in the loaded condition.

16. The apparatus of claim 13 in which orienting the first spring in a loaded condition also loads the second spring.

* * * * *